(12) United States Patent
Palenius et al.

(10) Patent No.: US 8,693,321 B2
(45) Date of Patent: Apr. 8, 2014

(54) MOBILE ASSISTED HANDOVER IN MOBILE COMMUNICATIONS NETWORKS

(75) Inventors: Torgny Palenius, Barsebäck (SE); Fredrik Gunnarsson, Linköping (SE); Johan Moe, Mantorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 114 days.

(21) Appl. No.: 13/321,679

(22) PCT Filed: May 28, 2010

(86) PCT No.: PCT/EP2010/057390
§ 371 (c)(1),
(2), (4) Date: Nov. 21, 2011

(87) PCT Pub. No.: WO2010/136553
PCT Pub. Date: Dec. 2, 2010

(65) Prior Publication Data
US 2012/0082135 A1    Apr. 5, 2012

Related U.S. Application Data

(60) Provisional application No. 61/220,051, filed on Jun. 24, 2009.

(30) Foreign Application Priority Data

May 29, 2009   (EP) .................................... 09007234

(51) Int. Cl.
*H04W 36/18* (2009.01)
*H04W 36/36* (2009.01)
(52) U.S. Cl.
CPC .................................... *H04W 36/36* (2013.01)
USPC ............................ 370/229; 370/331; 370/458

(58) Field of Classification Search
None
See application file for complete search history.

(56) References Cited

U.S. PATENT DOCUMENTS 6,940,369 B2 *  9/2005  Nakahashi et al. ............ 333/195
7,895,629 B1 *  2/2011  Shen et al. ....................... 725/62
(Continued)

FOREIGN PATENT DOCUMENTS

WO         2009065053 A2      5/2009

OTHER PUBLICATIONS

Nokia Siemens Networks, Nokia Corporation, published on May 4, 2009.*

(Continued)

*Primary Examiner* — Hassan Kizou
*Assistant Examiner* — Tejis Daya
(74) *Attorney, Agent, or Firm* — Coats and Bennett PLLC

(57) ABSTRACT

The invention relates to a technique for mobile assisted handover in mobile communications networks, e.g. Long Term Evolution (LTE) networks, in a situation of an ongoing data reception or data transmission of a mobile terminal which hinders reception of system information from a candidate cell for handover. A method embodiment of such technique is performed in a mobile terminal and comprises the steps of accepting information related to an ongoing data reception/transmission from at least one data reception/transmission component of the mobile terminal; establishing if the ongoing data reception/transmission enables a reception of a unique cell identifier indicating a candidate cell for handover; selectively halting the ongoing data reception/transmission, receiving the unique cell identifier of the candidate cell, and resuming afterwards the data reception/transmission.

12 Claims, 7 Drawing Sheets

(56) References Cited

U.S. PATENT DOCUMENTS

2008/0062911 A1* 3/2008 Choi et al. .................... 370/315
2009/0132675 A1* 5/2009 Horn et al. .................... 709/207
2010/0062783 A1* 3/2010 Luo et al. ...................... 455/450

OTHER PUBLICATIONS

3rd Generation Partnership Project. "CSG Enhanced Mobility Requirements," 3GPP TSG-RAN WG2 Meeting #66, R2-093217, San Francisco, California, USA, May 4-8, 2009.
3rd Generation Partnership Project. "Inter-Frequency/RAT Measurement Gap Control," 3GPP TSG-RAN WG1 and WG2 Joint Meeting, R2-060841, Athens, Greece, Mar. 27-31, 2006.
3rd Generation Partnership Project. "UE Measurements and Reporting of Global Cell Identity," 3GPP TSG-RAN WG2 #58bis, R2-072674, Orlando, USA, Jun. 25-29, 2007.
3rd Generation Partnership Project. "CSG Cell Identification and Procedures (E-UTRAN)," 3GPP TSG-RAN WG2 Meeting #61-bis, R2-081823, Shenzhen, China, Mar. 31-Apr. 4, 2008.
3rd Generation Partnership Project. "CSG Identity Aquisition," 3GPP TSG-RAN WG2 Meeting #62, R2-082272, Kansas City, Missouri, USA, May 5-9, 2008.
3rd Generation Partnership Project. "Summary of Email Discussion on Home eNB Inbound Mobility Support," 3GPP TSG-RAN WG2 Meeting #62, R2-082270, Kansas City, Missouri, USA, May 5-9, 2008.

* cited by examiner

MOBILE ASSISTED HANDOVER IN MOBILE COMMUNICATIONS NETWORKS

TECHNICAL FIELD

The invention relates to a technique for mobile assisted handover in mobile communications networks, such as Long Term Evolution (LTE) networks. In particular, the invention relates to a technique for handover in a situation of an ongoing data reception or data transmission of the mobile terminal which hinders reception of system information from a candidate cell for handover.

BACKGROUND

In order to enable mobility in cellular mobile communications systems, a key feature is the ability to perform a handover from one cell currently serving the mobile terminal to a new cell. The variety of handover techniques available today can be sorted into a variety of different classes. For example, a 'soft handover' comprises that a mobile terminal is connected for some time span during the handover to two base stations in parallel, while in a 'hard handover' the mobile terminal disconnects from the old base station before connecting to the new base station. A further classification sorts handover techniques into 'network controlled handover', 'mobile assisted handover' and 'mobile controlled handover'.

The $3^{rd}$ Generation Partnership Project (3GPP) is a standardization body currently working on a system concept termed 'Long Term Evolution (LTE) and System Architecture Evolution' (SAE). The handover technique that will presumably be used in the 3GPP LTE/SAE system is a mobile assisted hard handover, wherein the mobile assistance comprises that the mobile terminal or User Equipment (UE) performs downlink radio signal measurements, while the network will make the handover decision. The architecture of the 3GPP LTE/SAE system will be flat, i.e. the radio base stations termed 'evolved Node Bs' (eNBs) are directly connected with each other in the radio access network E-UTRAN (Evolved UMTS Radio Access Network) and are also directly connected to the core network. Therefore, there is no central controller such as the Base Station Controller (BSC) in a GSM system or Radio Network Controller (RNC) in a WCDMA or UTRAN system, in which the handover algorithm could be located. Instead, the handover decisions will be performed by the eNBs, specifically by the cell currently serving the mobile terminal.

In LTE, cells can be identified by unique cell identifiers as well as non-unique cell identifiers. A unique cell identifier ("Cell Identity") is uniquely identifying a cell at least within one mobile communications network (Public Land Mobile Network, PLMN). A non-unique cell identifier ("Physical Cell Identity") is in general not unique in a network, and may even not be unique in a local environment, (i.e. around a particular base station). However, the non-unique identifier when broadcasted, for example, from a candidate cell for handover can be detected by a UE relatively easy. For example, in LTE it is planned that 504 physical cell identities will be provided, wherein each identity is associated with a specific physical fingerprint of reference symbols. The unique cell identifier, on the other hand, is broadcasted as system information which is regularly but not continuously transmitted. The UE therefore needs to wait for the next time the unique cell identifier is broadcasted before it can be received and decoded.

The eNB maintains for each served cell a neighbour cell list indicating neighbouring cells. This list associates the non-unique identifier of a neighbouring cell and/or the unique cell identifier for the cell with connectivity information related to how to reach the eNB serving that cell. In many cases it will be sufficient that the UE reports the non-unique cell identifier of the candidate cell for handover to the serving eNB: When the non-unique cell identifier is known and locally unique, the eNB can connect to the base station of the candidate cell based on the neighbour cell list. If a non-unique cell identifier is provided which is unknown or is in fact non-unique in the neighbour cell list, the serving eNB requests the UE to provide the unique cell identifier for the candidate cell. Then the UE has to receive the system information from the candidate cell, has to decode the unique cell identifier therefrom and has to transmit the decoded unique cell identifier to the serving eNB.

In certain situations the mobile terminal will have no time to decode the unique cell identifier. Consider, for example, a case in which the mobile terminal is currently involved in a Voice-over-IP (VoIP) communication, which comprises receiving small data packets in regular intervals. The periodical data reception may prevent that the terminal can receive system information from a neighbouring cell in case of overlapping time slots (assuming that there is only one receiver chain available). In another exemplary situation, uplink data is acknowledged from the network, i.e. acknowledgements have regularly to be received which may also prevent receiving system information from a neighbouring cell. In principle, any service with too little discontinuous reception, either due to an ongoing reception of downlink data or of feedback to uplink data, may prevent receiving the unique cell identity. Thus, if any data is to be received, currently it is envisaged that the terminal may skip the provision of the unique cell identifier to the serving cell. However, this then prevents handover to the corresponding cell.

This situation will become particularly problematic, for example, in the field of Closed Subscriber Groups (CSGs). In such an environment, typically not much effort will be spent for network planning. For example, CSG cells may have assigned a non-unique cell identifier at random from a reserved set of non-unique cell identifiers. Then it will happen relatively often that a non-unique cell identifier is also locally non-unique. It is envisaged that the handover mechanism for handover to a CSG cell comprises a mandatory determination of the unique cell identifier of the cell (in case of CSG cells in LTE, apart from the Cell Identity a second kind of unique identifier is handled which indicates a CSG Identity; this CSG Identity is used for authorization purposes by the mobile terminal and therefore needs to be determined—however, it is the Cell Identity that may be mandatory in a measurement report to the serving cell). However, in the frequent case that the mobile terminal is involved in a conversational service, streaming service or similar service with insufficient discontinuous reception, a handover to such cell is prevented, as the terminal is unable to decode the unique cell identifier thereof. This problem poses a limit to the applicability of certain network scenarios such as CSGs.

WO 2009/065053 A2 relates to using identifiers to establish communication, wherein confusion resulting from assigning the same node identifier to multiple nodes is resolved through the use of confusion detection techniques and the use of unique identifiers for the nodes. In some aspects an access point and/or an access terminal may perform operations relating to detecting confusion and/or providing a unique identifier to resolve confusion.

Document XP050340920, Nokia Siemens Networks et al.: "CSG enhanced mobility requirements" relates to Closed Subscriber Group (CSG) enhanced mobility requirements and in particular to an analysis of the CSG connected mode mobility requirements. In most scenarios the connected mode mobility could be provided with already existing REL8 SIB1 reading mechanism. Only cases when it may not provide excellent user perception is during VoIP type of applications as then the DRX periods are more seldom. But even for those scenarios a couple of solutions are provided, i.e. User Equipment capability of reading neighbour cell SIBs and/or User Equipment initiated transmission pauses.

SUMMARY

There is a demand for a technique for a mobile assisted handover in a mobile communications network which enables a handover to a cell in case a non-unique cell identifier is not sufficient to identify the cell to the serving base station and an ongoing data reception or data transmission prevents a determination of the unique cell identifier of the candidate cell.

This demand is satisfied by a method for mobile assisted handover in a mobile communications network, wherein the method is performed in a mobile terminal and comprises the steps of accepting information related to an ongoing data reception or data transmission from at least one data reception component or data transmission component of the mobile terminal; establishing, based on the accepted information, if the ongoing data reception or data transmission enables a determination of a unique cell identifier indicating a candidate cell for handover; depending on the establishing step, selectively halting the ongoing data reception or data transmission, receiving the unique cell identifier of the candidate cell, and resuming, after the reception of the unique cell identifier, the data reception or data transmission; and transmitting the received unique cell identifier to a serving base station of the network.

The mobile communication network may be a 3GPP LTE/SAE network and the mobile terminal may be a User Equipment (UE) adapted for communication with such network.

One variant of the method comprises the prior step of transmitting to the serving base station a non-unique cell identifier indicating the candidate cell. This variant may comprise the prior step of receiving from the serving base station, in response to the transmission of the non-unique cell identifier, a request for providing the unique cell identifier of the candidate cell. This or other variants may comprise that the non-unique cell identifier and the unique cell identifier are delivered in one transmission to the serving base station. In case the unique cell identifier has to be delivered as a mandatory requirement, the mobile terminal may omit transmitting the non-unique identifier of the candidate cell to the serving base station.

The establishing step comprises determining if a reception of the unique cell identifier is possible within a given time interval without halting the ongoing data reception or data transmission. The accepting step may comprise accepting information indicating resources allocated for the data reception or data transmission. For example, the accepting step may comprise determining information, e.g. information indicating resources persistently allocated for the data reception or data transmission. In this variant, in case the unique cell identifier is transmitted by the candidate cell in regular time intervals, the establishing step may comprise identifying conflicting time slots among time slots scheduled for the data reception or data transmission and time slots for the reception of the unique cell identifier.

According to one realization of the method, the accepting step comprises accepting information indicating a data service to which the ongoing data reception or data transmission is related. In this realization, the accepting step may comprise accepting information from a service application implemented on the mobile terminal. For example, the step may include accessing the service application or the service application may without trigger provide the required information The establishing step may comprise comparing the accepted service information with one or more predefined service indications. The predefined service indications may relate to services classified as at least one of conversational services, streaming services, guaranteed bitrate services, and low priority services.

The ongoing data reception or data transmission may comprise receiving or transmitting data blocks in regular time intervals, such as, for example, receiving or transmitting a VoIP data stream. The data received during the ongoing data reception or data transmission may comprise at least one of user data and signalling (or control) data. For example, the user data may be VoIP data, speech data, video data, multimedia data, or any kind of streaming data. The signalling data may comprise, e.g., acknowledgements sent to acknowledge received data.

The step of halting the data reception or data transmission may comprise omitting a reception or transmission of data for one or more time slots. Additionally or alternatively, the step of halting the data reception or data transmission may comprise transmitting one or more data reception non-acknowledgement indications to the serving base station. This may trigger re-sending of data packets not received in the mobile terminal due to the halted data reception or data transmission.

The above-indicated demand is further satisfied by a computer readable medium having computer executable instructions for performing the steps of one or more of the methods and method aspects described herein when executed on one or more computing devices, for example a mobile terminal. The computer readable medium may be a permanent or rewriteable memory within or associated with a computing device or a removable CD-ROM, DVD or USB-stick.

The above-indicated demand is still further satisfied by a mobile terminal adapted for a mobile assisted handover in a mobile communications network, wherein the mobile terminal comprises a component adapted to accept information related to an ongoing data reception or data transmission from at least one data reception component or data transmission component of the mobile terminal; a component adapted to establish, based on the accepted information, if the ongoing data reception or data transmission enables a reception of a unique cell identifier indicating a candidate cell for handover, wherein the component is further adapted to determine if a reception of the unique cell identifiers is possible within a given time interval without halting the ongoing data reception or data transmission; one or more components adapted to, depending on the establishment step, selectively halt the ongoing data reception or data transmission, receive the unique cell identifier of the candidate cell, and resume, after the reception of the unique cell identifier, the ongoing data reception or data transmission; and a component adapted to transmit the received unique cell identifier to a serving base station of the network.

One realization of the mobile terminal may comprise at least one of a component adapted to accept information indicating resources allocated for the data reception or data transmission and a component adapted to accept information indicating a type of a data service to which the ongoing data reception or data transmission is related. Additionally or alternatively, the mobile terminal may comprise a component adapted to transmit one or more data reception non-acknowledgement indications to the serving base station.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as a specific network systems, network nodes, etc., in order to provide a thorough understanding of the current invention. It will be apparent to one skilled in the art that the current invention may be practiced in other embodiments that depart from these specific aspects. For example, an LTE environment will be introduced below for illustrating the invention, wherein a User Equipment (UE) communicates with an evolved NodeB (eNB). However, it is to be understood that the invention may also be implemented in other environments, i.e. based on other mobile communications technologies. In fact, the invention may be employed for any cellular communication system, in which a network controlled handover is performed based on local decisions, i.e. in which there is no centralized controller available in the RAN (or core network) and the radio base stations do not a priori know their neighbouring cells.

Those skilled in the art will further appreciate that functions explained hereinbelow may be implemented using individual hardware circuitry, but also using software functioning in conjunction with a or a general purpose computer, programmed microprocessor, field-programmable gate array (FPGA), application specific integrated circuit (ASIC) and/or one or more digital signal processors (DSPs). It will also be appreciated that when the current invention is described as a method, it may also be embodied in a computer processor and a memory coupled to a processor, wherein the memory is encoded with program code that performs the methods disclosed herein when executed by the processor.

Figure 1:
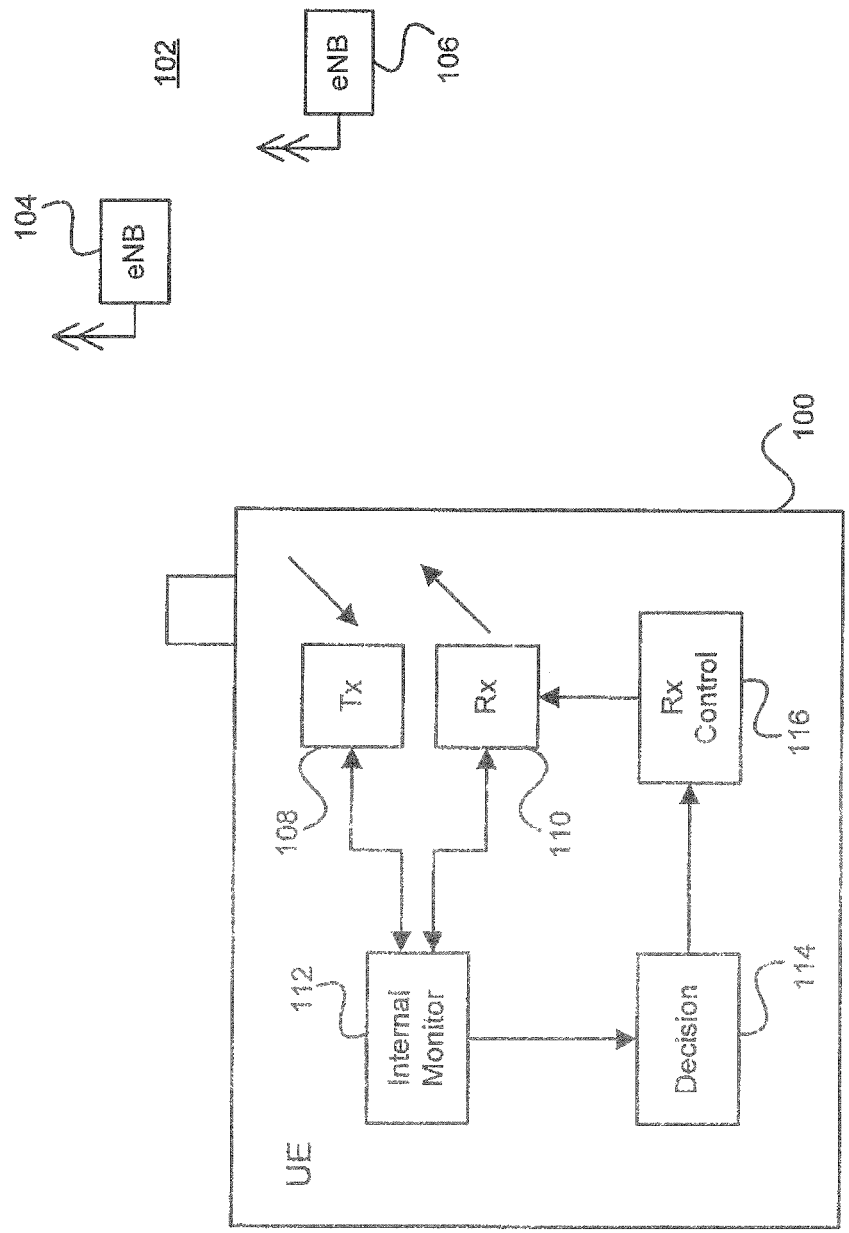
FIG. 1 schematically illustrates a first embodiment of a mobile terminal in communication with a base station.

FIG. 1 schematically illustrates functional building blocks of a first embodiment of a mobile terminal 100 in communication with a network 102 comprising base stations 104 and 106. It will be assumed hereinafter that network 102 is an LTE network, the base stations 104 and 106 are eNBs of network 102 and the mobile terminal 100 is a User Equipment (UE) adapted for communication with LTE network 102.

The UE 100 comprises a transmission component 108, a reception component 110, an internal monitor 112, a decision component 114 and a reception control component 116. Generally, the UE 100 is adapted for a mobile assisted handover in the LTE network 102, wherein in a situation in which the eNB 104 serves the UE 100, it is decided by the eNB 104 whether or not a handover of the UE 100 to a neighbouring cell served by eNB 106 is to be performed. The UE 100 assists in this decision by performing downlink radio measurements and providing the results of these measurements to the eNB 104. An operation of the UE 100 will now further be described with reference to the flow diagram of FIG. 2.

In step 202, the transmission component 108 operates to transmit to the serving eNB 104 a non-unique cell identifier indicating the eNB 106 as candidate cell for handover. The non-unique cell identifier may be one out of 504 identifiers available for non-unique identifiers in LTE system as described above. In step 204, the reception component 110 receives in response to the transmission of the non-unique cell identifier in step 202 from the serving eNB 104 a request for providing a unique cell identifier of the candidate cell 106. The eNB 104 may send the request in step 204 as it has been unable to determine the neighbouring cell meant by the non-unique identifier delivered in step 202, for example because the non-unique identifier is entirely unknown by the eNB 104 or because it is non-unique, i.e. it is represented in the neighbour cell list of eNB 104 two or more times as an indication of different neighbouring cells.

In response to the request received in step 204, the internal monitor 112 accepts in step 206 from at least one of the transmission component 108 and reception component 110 and/or further internal components of UE 100 information related to an ongoing data reception or data transmission. For example, the internal monitor may access one or both of components 108 and 110, or these components may provide information in a buffer for access by monitor 112, or may provide information directly to monitor 112. In step 208, the decision component 114 operates to establish, based on the information accepted by the internal monitor 112, if the ongoing data reception/data transmission enables a determination of the unique cell identifier of candidate cell 106 for handover. This operation of the decision component 114 may for example comprise a determination of whether there is any data reception/data transmission ongoing.

Should this be the case, the establishment step 208 may further comprise implicitly or explicitly classifying the ongoing data reception/data transmission according to whether it will allow a decoding of the unique cell identifier or not. For example, in case a data reception may be classified as a short-term non-periodic data reception, the decision component 114 may decide to not take any further action but to await the end of data reception in order to subsequently receive the required system information, i.e. to avoid an interrupt of the ongoing data reception, and the decision component 114 may trigger a scheduler of the UE 100 accordingly.

Figure 2:
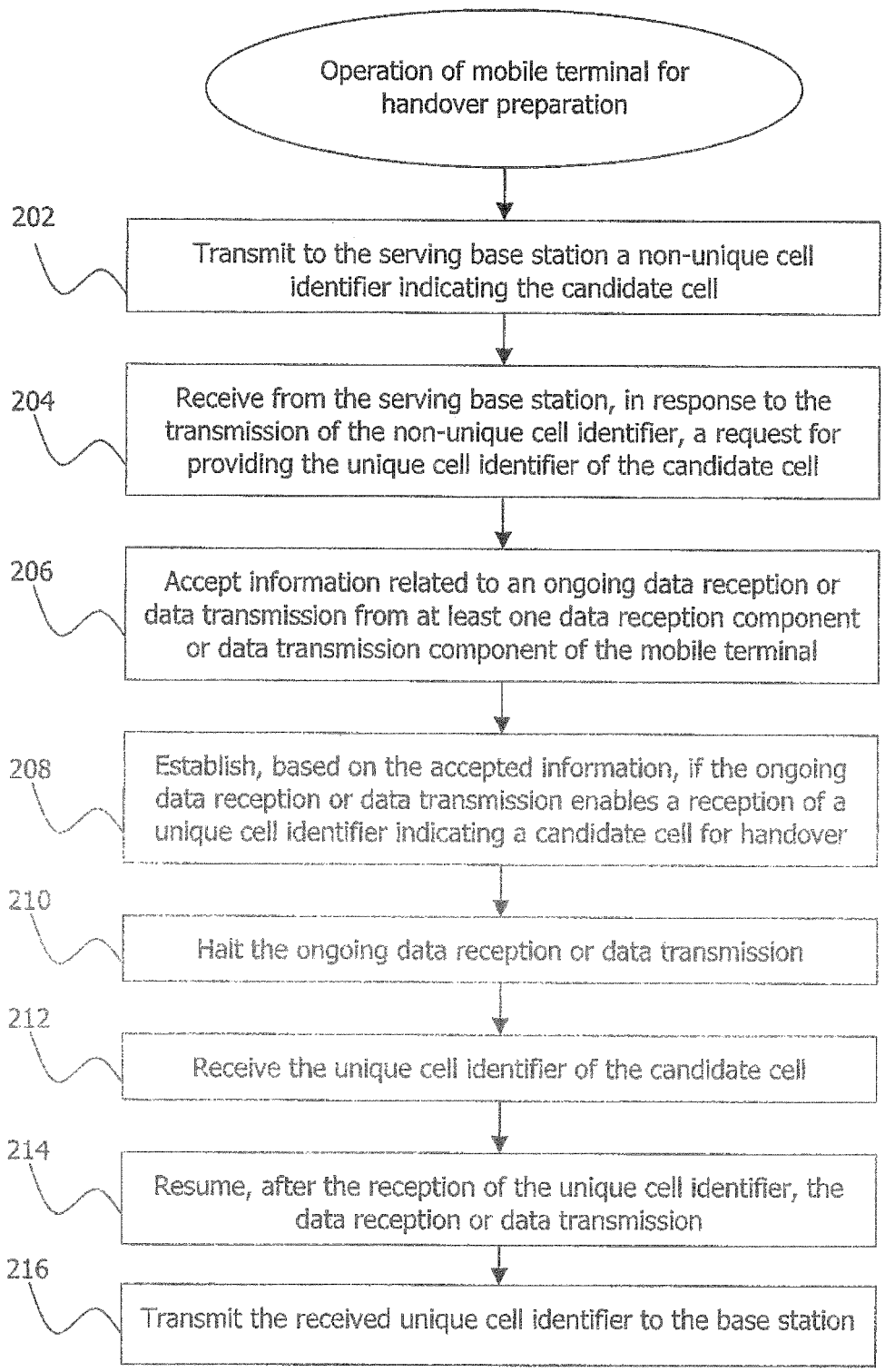
FIG. 2 is a flow diagram illustrating an operation of the mobile terminal of FIG. 1.

In the flow diagram of FIG. 2 it is instead assumed that the decision component 114 achieves the result that an ongoing data reception/data transmission is critical because it does not allow determining the unique cell identifier of neighbouring cell 106, and the decision component 114 provides a corresponding trigger signal to the reception control component 116. Based on this trigger signal, the reception control component 112 operates in step 210 to halt an ongoing data reception/data transmission by controlling one or both of reception component 110 and transmission component 108 accordingly (only the control of reception component 110 is explicitly indicated in FIG. 2).

In step 212, the reception control component 112 is involved in receiving the unique cell identifier of the candidate cell. This step may comprise controlling the reception component 110 in order to receive system information from the neighbouring cell 106. The term 'reception' of a unique cell identifier is generally understood herein as a successful reception which includes that the mobile terminal may tune to the candidate cell for a time span covering the time slot during which the system information or at least the unique cell identifier is transmitted, or a least for a time span which allows decoding the unique cell identifier in the mobile terminal. The decoding of the received signal from the candidate cell representing the unique cell identifier may in principle be performed after the reception, e.g. in parallel to subsequent steps.

In step 214, the reception control component 112 operates to resume, after the reception of the unique cell identifier, the data reception which has been halted in step 210. Eventually, in step 216, the transmission component 108 operates to transmit the successfully received and decoded unique cell identifier to the serving eNB 104. While for the sake of illustration the reception control component 116 is illustrated in FIG. 1 as a single component, the functionality thereof may also be distributed over several entities of a mobile terminal.

While it has been said above that steps 206 and 208 are performed only in response to the request of the serving eNB in step 204, in other embodiments steps similar to steps 206 and 208 may be performed unconditionally, i.e. before and/or without the reception of an explicit request for a provisioning of a unique cell identifier.

In the embodiment of FIGS. 1 and 2, the UE 100 is configured to sequentially provide first a non-unique cell identifier to the serving eNB (step 202) and then to provide the unique cell identifier to the eNB 104 (step 214), wherein the unique cell identifier is only provided to the eNB 104 upon request. In other embodiments, the mobile terminal may be configured permanently, via administrative action and/or via an instruction from a serving base station to provide a unique cell identifier to the network without explicit request. Additionally or alternatively, in some embodiments the mobile terminal may be configured to provide the non-unique cell identifier and the unique cell identifier in a single transmission to the serving base station. In still other embodiments, the mobile terminal may be permanently or otherwise configured to not provide the non-unique cell identifier at all, for example in a CSG scenario.

Figure 3:
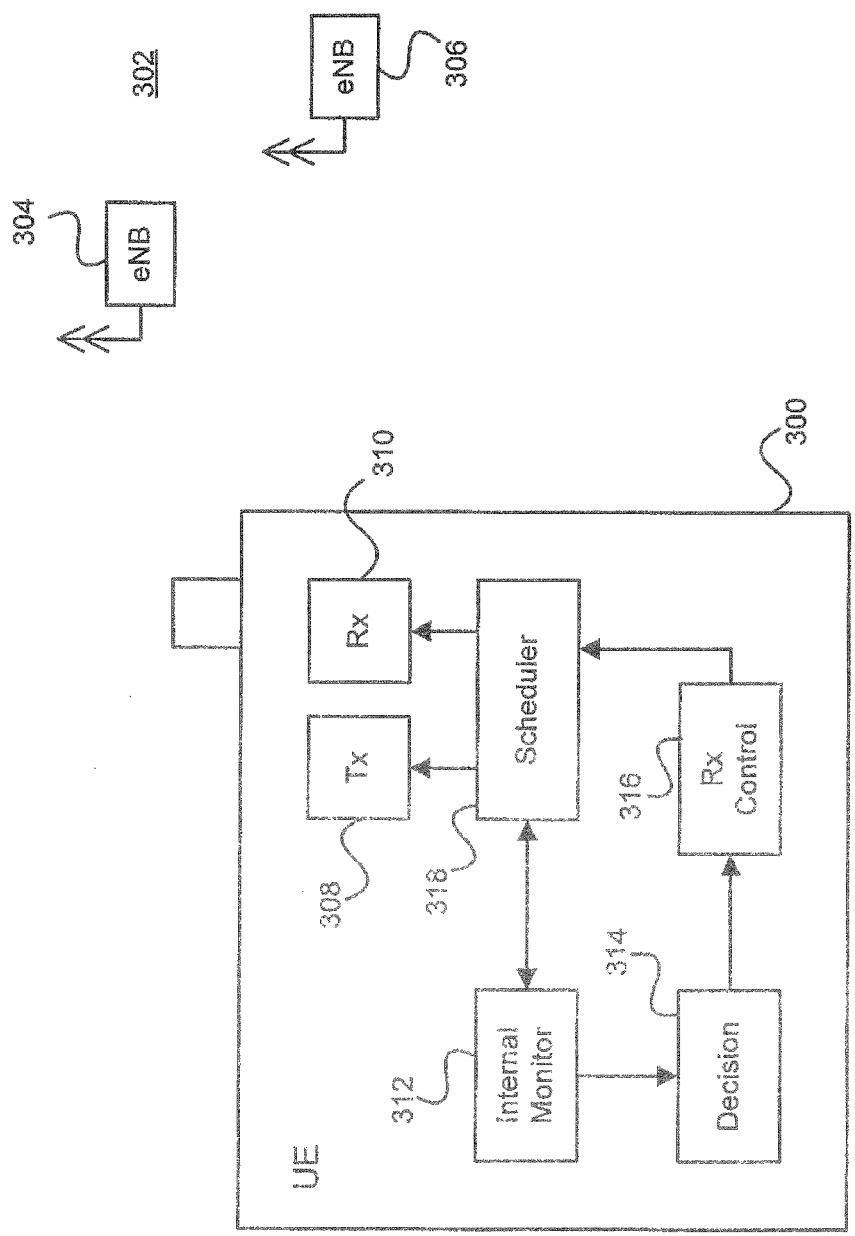
FIG. 3 schematically illustrates a second embodiment of a mobile terminal.

FIG. 3 schematically illustrates functional building blocks of a further embodiment of a mobile terminal 300 in communication with a network 302 comprising base stations 304 and 306. The network scenario of the embodiment of FIG. 3 is similar to that of FIG. 1. Specifically, it is assumed that also network 302 is an LTE network, the base stations 304 and 306 are eNBs thereof and the mobile terminal 300 is a UE adapted for communication with LTE network 302. The embodiment of FIG. 3 is intended to illustrate in more detail a particular internal operation of the UE 300. Any aspects of the embodiment illustrated in FIGS. 3 to 5 which are not explicitly discussed hereinafter can be assumed to be similar to what has been described with regard to the embodiment of FIGS. 1 and 2.

The UE 300 comprises a transmission component 308, a reception component 310, an internal monitor 312, a decision component 314, a reception control component 316 and a scheduler 318. An operation of the UE 300 will now be described with reference to the flow diagram of FIG. 4 under the assumption that eNB 304 serves UE 300 and eNB 306 provides a neighbouring cell which is a candidate cell for handover for the UE 300.

The scheduler 318 is adapted to manage resources of the UE 300 related to transmission and/or reception of data. The scheduler 318 may in particular act to allocate resources such as time slots and to control the transmission component 308 and reception component 310 accordingly. In step 402, the internal monitor 312 operates to accept information from the scheduler 318. The monitor 312 may, for example, actively access the scheduler 318 for information and/or the scheduler 318 may be configured to provide information to the internal monitor 312 without an explicit trigger.

Figure 5:
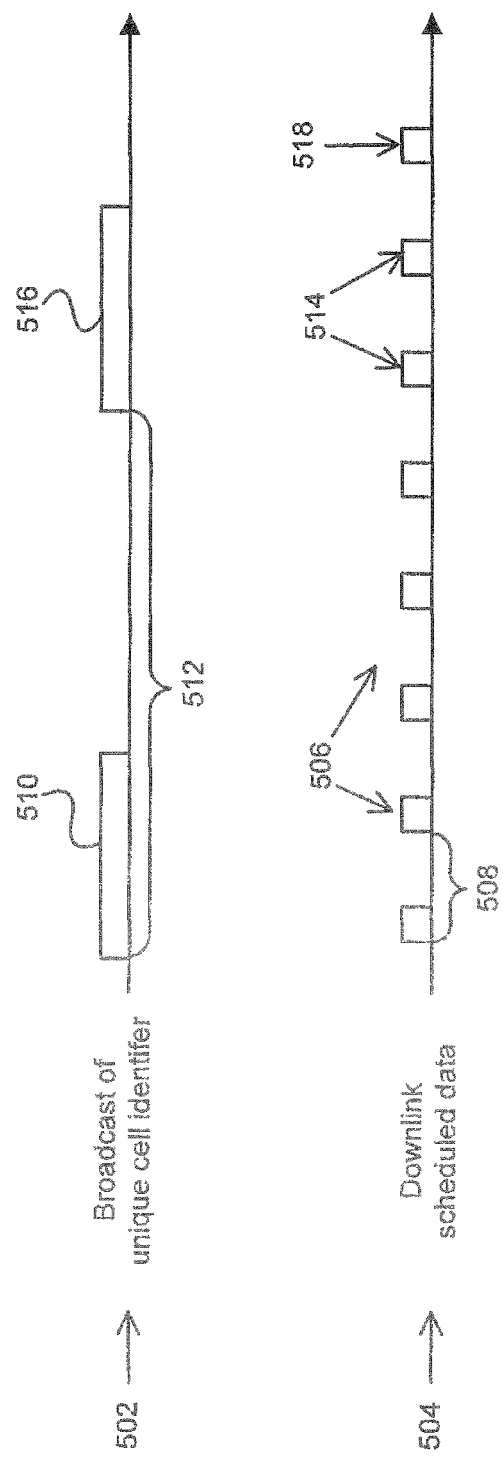
FIG. 5 illustrates time slots for the reception of system information from a candidate cell and a downlink data reception.

Generally, the monitor 312 accepts information indicating resources allocated for a data reception/transmission. FIG. 5 illustrates an example for the type of information which may be accepted by the internal monitor 312. Two transmission time schemes 502 and 504 are depicted each in the form of a time axis and shaded areas sequentially arranged thereon indicating transmission time slots. Time scheme 502 relates to the broadcast of system information including the unique cell identifier of cell 306. Time scheme 504 relates to an ongoing data reception of UE 300. The data reception may belong to an ongoing VoIP communication according to which in each of time slots 506 a VoIP data packet is received. For example, the time slot 506 may have a length of 2 milliseconds (ms) and one packet is received in each time period 508 of duration 20 ms. The system information broadcast 510, on the other hand, may have a duration of 30 ms and may be repeated every time period 512 of duration 80 ms.

The scheduler 318 has resources persistently allocated for the data reception indicated by time scheme 504, which includes controlling the reception component 310 according to time scheme 504. In order for preparing the decision to be taken by component 314, the internal monitor 312 accepts information representing the time scheme 504 from the scheduler 318. The internal monitor 312 may also accept information regarding the time scheme 502 from either the scheduler 318 or another component of UE 300.

In steps 404 and 406, the decision component 314 operates to estimate if the data reception ongoing according to the time scheme 504 enables reception of the unique cell identifier from the candidate cell 306. This determination is started in step 404 by identifying possibly conflicting time slots, which comprises processing (e.g. comparing) information related to the time slots 506 scheduled for the VoIP data reception in scheduler 318 and information related to the time slots 510 for the reception of the system information of neighbouring cell 306.

In step 406, the decision component 314 determines if a reception of the unique cell identifier of cell 306 is possible within a given time interval without halting the ongoing data reception. The given time interval may be related, for example, to the repetition time interval 512 of the system information broadcast of cell 306. The given time interval may generally be chosen to include a time period long enough for a successful reception of the system information including the cell identity. Which time interval is actually examined by decision logic 314 may also depend on the type of the service to which the ongoing data reception is related. For example, in case the service would be a download service, the decision component 314 would be able to determine when the download ends. In the example discussed here it is assumed that the data reception as illustrated with time scheme 504 in FIG. 5 is a conversational service such as VoIP. In this case the decision logic will generally be unable to predict when the ongoing data reception ends.

Assuming that UE 300 has a single receiving chain only, it is clear from FIG. 5 that there is a conflict, i.e. data reception in time slots 506 prevents data reception in time slots 510: As there are time slots 506 scheduled within the time span covered by each time slot 510, it is not possible for UE 300 to continuously adjust to cell 306 during a complete time slot 510, and therefore a unique cell identifier broadcasted in the system information could not be successfully decoded, no matter which time interval is actually examined by the decision logic of component 314. Thus, the decision component 314 will decide that it will not be possible to receive and decode the unique cell identifier of cell 306 without halting the ongoing data reception.

Triggered by the decision of component 314, in step 408 the reception control component 316 of UE 300 operates in a way similar to steps 210 to 214 of FIG. 2, the details thereof will not be repeated here. Generally, the reception control component 316 operates to control the scheduler 318 and/or reception component 310 to halt the ongoing data reception, for example cancel scheduled time slots 514 as indicated in FIG. 5 and to instead schedule a reception of system information of cell 306 during time slot 516, and to reschedule the VoIP data reception only from time slot 518 on.

Figure 4:
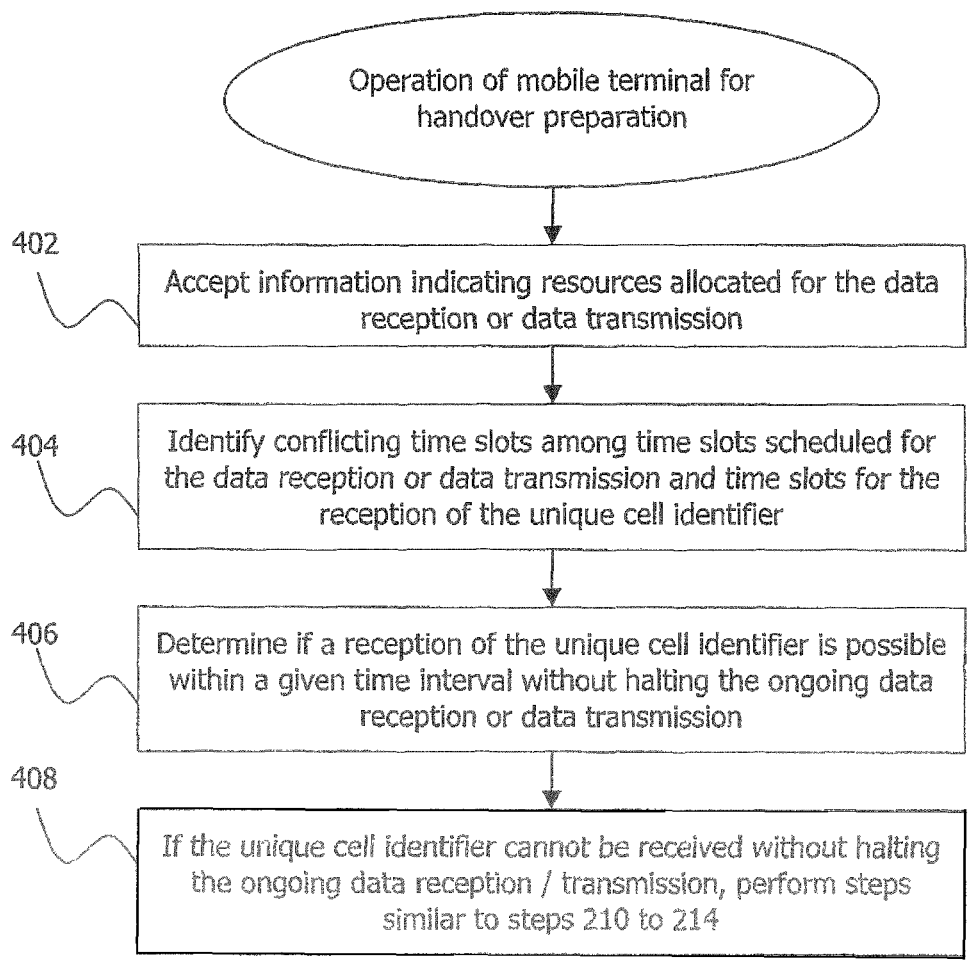
FIG. 4 is a flow diagram illustrating an operation of the mobile terminal of FIG. 3.

The operation of UE 300 may also include steps similar to steps 202 and/or 204 of FIG. 2, but such steps are omitted in the flow diagram of FIG. 4 for the sake of brevity. Alternatively, the UE 300 may be configured to perform either step 402 or the entire sequence of steps 402 to 408 independent of a request for a unique cell identifier from the serving base station. For example, the UE may perform step 402 permanently or may perform steps 402 to 408 permanently or after each provision of a non-unique cell identifier to the serving base station. As still another alternative, the UE may perform the steps 402 to 408 as an alternative to providing a non-unique cell identifier to the serving base station.

With regard to the scenario illustrated in FIG. 5, the UE 300 may operate to send negative acknowledgements regarding the packets not received during time slots 514. In this way, the network 304 may be triggered to re-transmit one or more of the corresponding data packets.

The accepting step 402 may be seen as a particular implementation of the accepting step 206 of FIG. 2. In particular, the internal monitor 312 from the scheduler 318 may be seen as an implementation of the monitor 112 of FIG. 1 as accepting information related to the reception/transmission components of the mobile terminal. The steps 404 and 406 may be seen as a particular implementation of the establishing step 208 of FIG. 2. However, other or further steps may also be included in the accepting step 206 and the establishing step 208.

Figure 6:
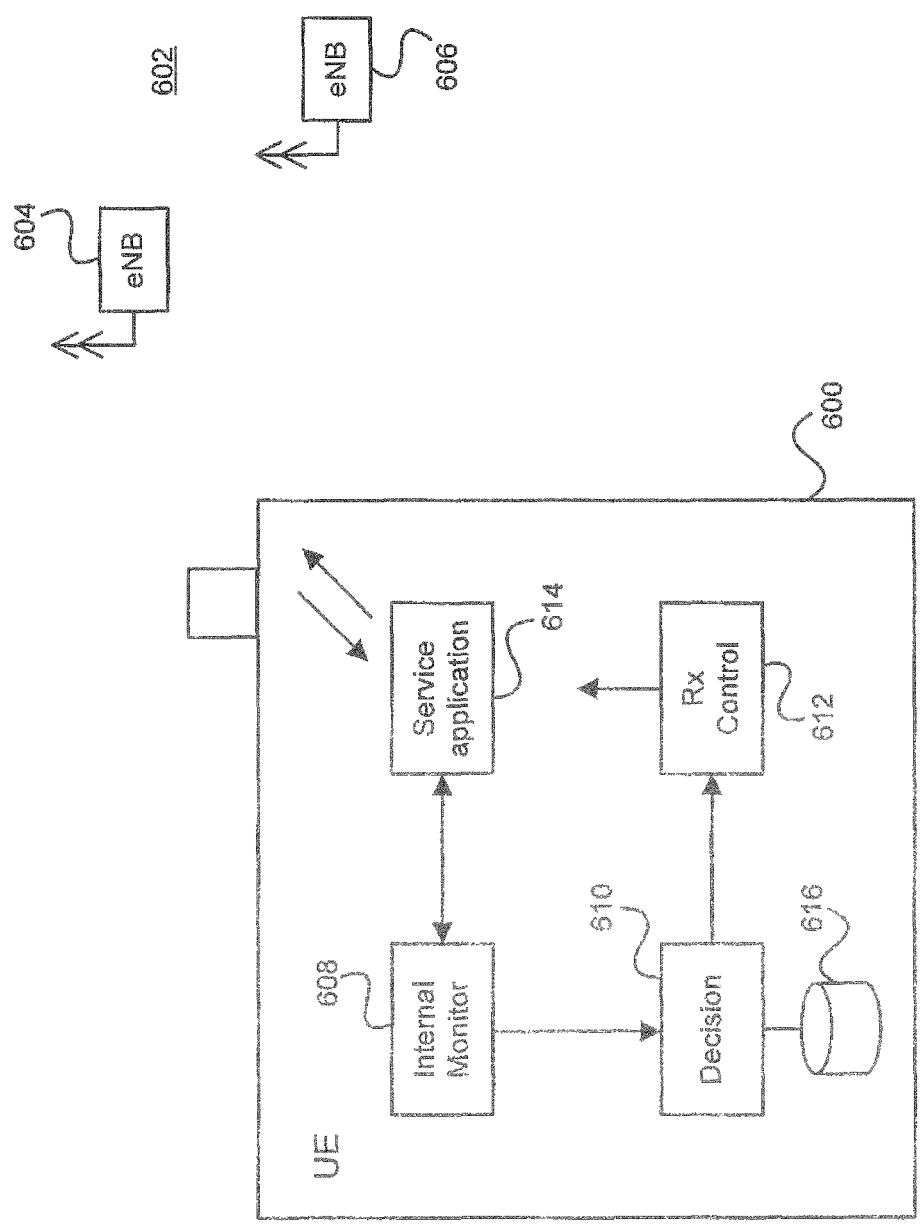
FIG. 6 schematically illustrates a third embodiment of a mobile terminal.
Figure 7:
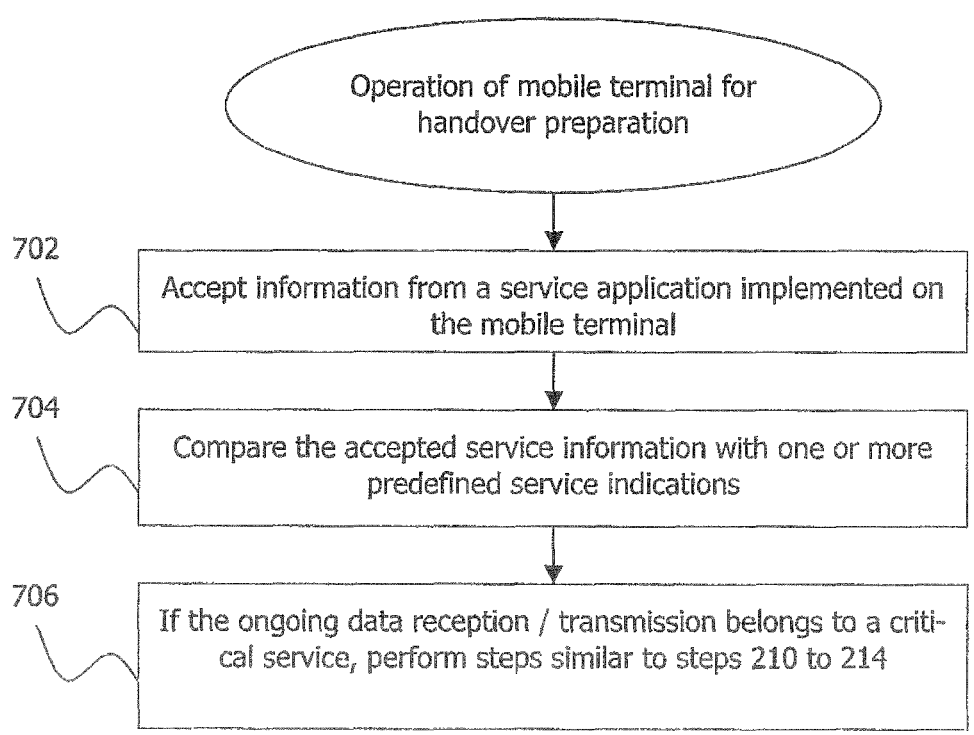
FIG. 7 is a flow diagram illustrating an operation of the mobile terminal of FIG. 6.

FIG. 6 schematically illustrates functional building blocks of a still further embodiment of a mobile terminal 600 adapted for communication with a mobile communications network 602 comprising base stations 604 and 606. Again it is assumed that the network scenario of the embodiment of FIG. 6 is similar to that of FIGS. 1 and 3; specifically, it is assumed that network 602 is an LTE network, the base stations 604 and 606 are eNBs thereof and the mobile terminal 600 is a UE adapted for communication with LTE network 602. Any aspects of the embodiment illustrated in FIGS. 6 and 7 not explicitly discussed hereinbelow can be assumed to be similar to what has been described with reference to the former embodiments.

The UE 600 comprises an internal monitor 608, a decision component 610, a reception control component 612 and a service application 614. The application 614 is related to a data reception and/or data transmission. For the example discussed here it is assumed that the service application 614 is a VoIP application currently operative to perform a VoIP communication via network 602 which comprises both a data reception and a data transmission. UE 600 is in a current situation served by eNB 604, while eNB 606 provides a candidate cell for handover. An operation of the UE 600 in this situation will now be described with reference to the flow diagram in FIG. 7.

In step 702, the internal monitor 608 accepts from the service application 614 information indicating a data service to which the ongoing data reception and data transmission is related. For example, the internal monitor 608 may access service application 614 in order to determine that application 614 is a conversational application and that it is currently active, i.e. a communication is ongoing. In another embodiment, such information is provided by service application 614 in a predefined storage area of UE 600 at the time the application 614 becomes active, and the monitor 608 accesses the information in the predefined storage area.

In step 704, the decision component 610 establishes, based on the information provided by monitor 608, if the ongoing reception/transmission enables a determination of the unique cell identifier of candidate cell 606 by comparing the service information accepted by the internal monitor 608 with predefined service indications. As exemplarily depicted in FIG. 6, the component 610 may have access to a predefined list of service types stored in a storage area 616 of UE 600. In case the service information provided by monitor 608 indicates a service falling under one of the stored service indications, the component 610 decides that the ongoing data reception belongs to a critical service which will not allow to receive and decode the unique cell identifier from neighbouring cell 606 without taking further action.

The service indications in storage 616 may, e.g., directly indicate specific applications such as service application 614, or may indicate a class of service applications. Such classes may be "speech services", "VoIP applications" or more generally "conversational services" and/or "streaming services". The service classes or types indicated may comprise services for which it is expected that there is too little discontinued reception to enable cell identity decoding for neighbouring candidate cells ("critical services"). For example, any kind of conversational or streaming service may be included in the list of critical services, as for such services it is in general not possible for a decision logic in a mobile terminal to decide whether a data reception or data transmission related to such service will end within a reasonable time window and will thus allow reception of system information from neighbouring cells. Additionally or alternatively, other classification criterions may be applied. For example, low priority services may be classified as critical services (e.g. because conversational or streaming services are often classified as low priority services) or guaranteed bitrate services may be classified as critical services (in contrast to, for example, best effort services or services guaranteeing a low data loss).

The list of critical services or service types in storage 616 may be implemented in the UE 600 at manufacturing time or via administrative action, and/or may be downloaded or updated by or via network 602. Having established that the ongoing data reception/data transmission belongs to a critical service which presumably will not allow reception of system information from eNB 606, in step 706 action is taken in order to ensure that the unique cell identifier of cell 606 can nevertheless be received, decoded and provided to the serving eNB 604 such that in this way handover to cell 606 is enabled. The actual operations performed in step 706 may be similar to steps 210 to 214 of FIG. 2 and will therefore not be repeated here.

It is to be noted that the embodiments illustrated in the foregoing figures may be combined with each other. For example, an internal monitor may operate to accepting information from an internal scheduler of the mobile terminal and may in parallel accept information from service applications implemented on the mobile terminal. Similarly, a decision logic of the terminal may combine the various approaches discussed above.

The technique proposed herein enables handover to a cell in case a non-unique cell identifier is not sufficient to identify the cell to the serving base station and an ongoing data reception or data transmission lets not enough time for a reception of a unique cell identifier from the candidate cell. The mobile terminal establishes, based on internal information, whether a reception of the unique cell identifier of the candidate cell will be possible or not. If not, the mobile terminal takes appropriate actions, for example, halts the ongoing data reception/transmission for the time required to determine the unique cell identifier of the candidate cell. Such techniques do not require any information from outside the terminal, i.e. no additional network traffic is generated; for example no priority information regarding data receptions or transmissions needs to be provided by the serving base station. Processing information related to an internal scheduler of and/or service applications implemented in the mobile terminal requires small modifications only for available control software in the terminal.

Conversational or streaming services may be considered critical in the scenarios discussed herein, as they require regular receptions/transmissions lasting for an undefined time. On the other hand, discarding one or few data packets received or transmitted normally leads only to a minor degradation of such services, if at all. Therefore, the proposed techniques enable a handover despite the ongoing data reception/transmission while minimizing service degradation.

After all, with the proposed technique the terminal may assist a decision for handover in a particularly efficient way regarding network traffic and resource usage within the terminal. The technique is particularly suited, amongst others, for enabling handover in CSG scenarios and similar scenarios in which provision of unique cell identifiers is mandatorily requested.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for mobile-assisted handover in a mobile communications network, the method being performed in a mobile terminal and comprising:
    accepting information related to an on-going data reception or data transmission from at least one data reception component or data transmission component of the mobile terminal;
    establishing, based on the accepted information, if the on-going data reception or data transmission enables reception of a unique cell identifier indicating a candidate cell for handover, wherein the establishing comprises determining if reception of the unique cell identifier is possible within a given time interval without halting the on-going data reception or data transmission;
    responsive to a determination that the on-going data reception or data transmission enables reception of the unique cell identifier, but that such reception is not possible without halting the on-going data reception or data transmission, selectively:
        halting the on-going data reception or data transmission;
        receiving the unique cell identifier of the candidate cell; and
        resuming, after the reception of the unique cell identifier, the data reception or data transmission;
    transmitting the received unique cell identifier to a serving base station of the network;
    wherein the accepting information related to an on-going data reception or data transmission comprises accepting information indicating resources allocated for the data reception or data transmission;
    wherein the unique cell identifier is transmitted by the candidate cell in regular time intervals; and
    wherein the establishing if the on-going data reception or data transmission enables reception of a unique cell identifier indicating a candidate cell for handover comprises identifying conflicting time slots among time slots scheduled for the data reception or data transmission and time slots for the reception of the unique cell identifier.

2. The method of claim 1, further comprising:
    transmitting to the serving base station a non-unique cell identifier indicating the candidate cell prior to said transmitting the received unique cell identifier to the serving base station.

3. The method of claim 2, further comprising:
    receiving from the serving base station, in response to the transmission of the non-unique cell identifier, a request for providing the unique cell identifier of the candidate cell.

4. The method of claim 1, wherein said accepting information related to an on-going data reception or data transmission comprises accepting information indicating a type of a data service to which the on-going data reception or data transmission is related.

5. The method of claim 4, wherein said accepting information related to an on-going data reception or data transmission comprises accepting information from a service application implemented on the mobile terminal.

6. The method of claim 1, wherein said establishing if the on-going data reception or data transmission enables reception of a unique cell identifier indicating a candidate cell for handover comprises comparing the accepted service information with one or more predefined service indications.

7. The method of claim 6, wherein the predefined service indications relate to services classified as at least one of conversational services, streaming services, guaranteed bitrate services, and low priority services.

8. The method of claim 1, wherein the halting the data reception or data transmission comprises transmitting one or more data reception non-acknowledgement indications to the serving base station.

9. The method of claim 1, wherein the mobile communication network is a Long Term Evolution (LTE) network.

10. A computer program product stored in a non-transitory computer-readable medium, said computer program product comprising program instructions for mobile-assisted handover in a mobile communications network, the computer program product comprising computer program code which, when run on a mobile terminal, configures the mobile terminal to:
    accept information related to an on-going data reception or data transmission from at least one data reception component or data transmission component of the mobile terminal;
    establish, based on the accepted information, if the on-going data reception or data transmission enables reception of a unique cell identifier indicating a candidate cell for handover, wherein the establishing comprises determining whether reception of the unique cell identifier is possible within a given time interval without halting the on-going data reception or data transmission;
responsive to a determination that the on-going data reception or data transmission enables reception of the unique cell identifier, but that such reception is not possible without halting the on-going data reception or data transmission, the mobile terminal being configured to selectively:
  halt the on-going data reception or data transmission;
  receive the unique cell identifier of the candidate cell; and
  resume, after the reception of the unique cell identifier, the data reception or data transmission; and
transmit the received unique cell identifier to a serving base station of the network;
wherein, to accept information related to an on-going data reception or data transmission, the computer program code configures the mobile terminal to accept information indicating resources allocated for the data reception or data transmission;
wherein the unique cell identifier is transmitted by the candidate cell in regular time intervals; and
wherein, to establish if the on-going data reception or data transmission enables reception of a unique cell identifier indicating a candidate cell for handover, the computer program code configures the mobile terminal to identify conflicting time slots among time slots scheduled for the data reception or data transmission and time slots for the reception of the unique cell identifier.

11. A mobile terminal configured to perform a mobile-assisted handover in a mobile communications network, the mobile terminal comprising:
  one or more processing circuits configured to:
    accept information related to an on-going data reception or data transmission from at least one data reception component or data transmission component of the mobile terminal;
    establish, based on the accepted information, if the on-going data reception or data transmission enables reception of a unique cell identifier indicating a candidate cell for handover; and
    determine if reception of the unique cell identifier is possible within a given time interval without halting the on-going data reception or data transmission; and
    responsive to a determination that the on-going data reception or data transmission enables reception of the unique cell identifier, but that such reception is not possible without halting the on-going data reception or data transmission, selectively:
      halt the on-going data reception or data transmission;
      receive the unique cell identifier of the candidate cell; and
      resume, after the reception of the unique cell identifier, the on-going data reception or data transmission; and
  a transmitter configured to transmit the received unique cell identifier to a serving base station of the network;
  wherein, to accept information related to an on-going data reception or data transmission, the one or more processing circuits are configured to accept information indicating resources allocated for the data reception or data transmission;
  wherein the unique cell identifier is transmitted by the candidate cell in regular time intervals; and
  wherein, to establish if the on-going data reception or data transmission enables reception of a unique cell identifier indicating a candidate cell for handover, the one or more processing circuits are configured to identify conflicting time slots among time slots scheduled for the data reception or data transmission and time slots for the reception of the unique cell identifier.

12. The mobile terminal of claim 11, wherein the one or more processing circuits are further configured to accept information indicating a type of a data service to which the on-going data reception or data transmission is related.

* * * * *